United States Patent [19]

Chow et al.

[11] Patent Number: 5,975,416
[45] Date of Patent: Nov. 2, 1999

[54] MODULATED LASER DATA TRANSFER

[75] Inventors: Joseph Chow, Hungtington; William Tracy, Floral Park, both of N.Y.

[73] Assignee: Symbol Technologies, Inc., Holtsville, N.Y.

[21] Appl. No.: 08/797,824

[22] Filed: Feb. 10, 1997

Related U.S. Application Data

[63] Continuation-in-part of application No. 08/496,723, Jun. 29, 1995, abandoned.

[51] Int. Cl.[6] .................................................. G06K 15/00
[52] U.S. Cl. ................ 235/383; 235/462.13; 235/462.15
[58] Field of Search ......................... 235/462.49, 462.45, 235/462.46, 462.13, 462.15, 462.24, 462.01, 472.01, 472.02, 472.03, 383, 385, 375; 186/52, 56; 40/446, 447, 448; 340/825.35, 572; 359/144

[56] References Cited

U.S. PATENT DOCUMENTS

| | | | |
|---|---|---|---|
| 3,573,463 | 4/1971 | Goodwin et al. | 359/114 |
| 3,867,571 | 2/1975 | Starkweather et al. | 358/481 |
| 4,272,193 | 6/1981 | Eastman et al. | 356/349 |
| 4,500,880 | 2/1985 | Gomersall et al. | 340/825.35 |
| 4,758,717 | 7/1988 | Shepard et al. | 235/462.46 |
| 4,783,740 | 11/1988 | Ishizawa et al. | 235/385 X |
| 5,019,811 | 5/1991 | Olsson et al. | 340/825.35 X |
| 5,111,196 | 5/1992 | Hunt | 235/383 X |
| 5,151,684 | 9/1992 | Johnsen | 340/572 |
| 5,465,085 | 11/1995 | Caldwell et al. | 235/383 X |
| 5,468,948 | 11/1995 | Koenck et al. | 235/472 |
| 5,602,380 | 2/1997 | Bishay | 235/462.46 |
| 5,668,560 | 9/1997 | Evans et al. | 343/702 |

*Primary Examiner*—Michael G. Lee
*Assistant Examiner*—Karl D. Frech
*Attorney, Agent, or Firm*—Kirschstein, et al.

[57] ABSTRACT

A data transfer system for an LCD price tagging arrangement includes an electro-optical scanner and one or more LCD price tags. Each LCD price tag is associated with a given product in a retail outlet and carries price or other information relating to that product. The LCD price tag includes an electro-optical detector for detecting a beam generated by the scanner. The scanner light beam generating source is modulated such that the beam carries product information. Accordingly the price or other product information on the LCD price tag can be quickly and efficiently updated.

20 Claims, 6 Drawing Sheets

MODULATED LASER DATA TRANSFER

REFERENCE TO RELATED APPLICATIONS

This application is a continuation-in-part of U.S. application Ser. No. 08/496,723 filed Jun. 29, 1995, now abandoned.

BACKGROUND OF THE INVENTION

1. Field of the Invention

The invention relates to a product information display device and a data transfer arrangement, in particular a modulated laser data transfer arrangement, for example for use in transferring data to a remote product status display device such as an LCD supermarket shelf tag.

2. Description of the Related Art

Figure 1:
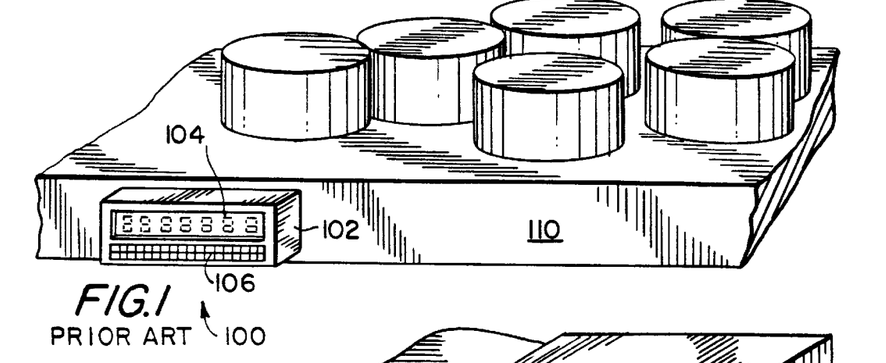
FIG. 1 is a perspective view of a prior art LCD price tagging system.

Recent developments in store price tagging technology have been directed towards improving the accuracy and consistency of price tagging of products, together with the visual attractiveness of tagging systems. One such development has been the LCD price tag. Such systems are well known to the skilled man and can be implemented without the need for detailed discussion here. As a brief summary, however, an LCD price tag system is shown in FIG. 1, generally referenced 100. An LCD price tag 102 includes an LCD display 104 and manual data input means such as a series of keys 106; the keys are preferably concealed to avoid tampering by customers. The LCD price tag 102 displays the price of the items 108 on a shelf 110 on which the price tag 102 is mounted. When it is desired to change the price of the items 108, this is a laborious task as the price tag 102 must be altered manually. It will be seen that where a number of prices have to be changed, the task becomes correspondingly more laborious and time consuming. In a modern sales environment where prices are changed very regularly it will be seen that considerable disadvantages are associated with the known system.

In another aspect, electro-optical readers, such as bar code symbol readers, are now quite common. Typically, a bar code symbol comprises one or more rows of light and dark regions, typically in the form of rectangles. The widths of the dark regions, i.e., the bars, and/or the widths of the light regions, i.e., the spaces, between the bars indicate encoded information to be read.

A bar code symbol reader illuminates the symbol and senses light reflected from the coded regions to detect the widths and spacings of the coded regions and derive the encoded information. Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the readers. The readers therefore must be easy and convenient to operate.

A variety of scanning systems are known. One particularly advantageous type of reader is an optical scanner which scans a beam of light, such as a laser beam, across the symbols. Laser scanner systems and components of the type exemplified by U.S. Pat. Nos. 4,387,297 and 4,760,248—which are owned by the assignee of the instant invention and are incorporated by reference herein—have generally been designed to read indicia having parts of different light reflectivity, i.e., bar code symbols, particularly of the Universal Product Code (UPC) type, at a certain working range or reading distance from a hand-held or stationary scanner.

Figure 2:
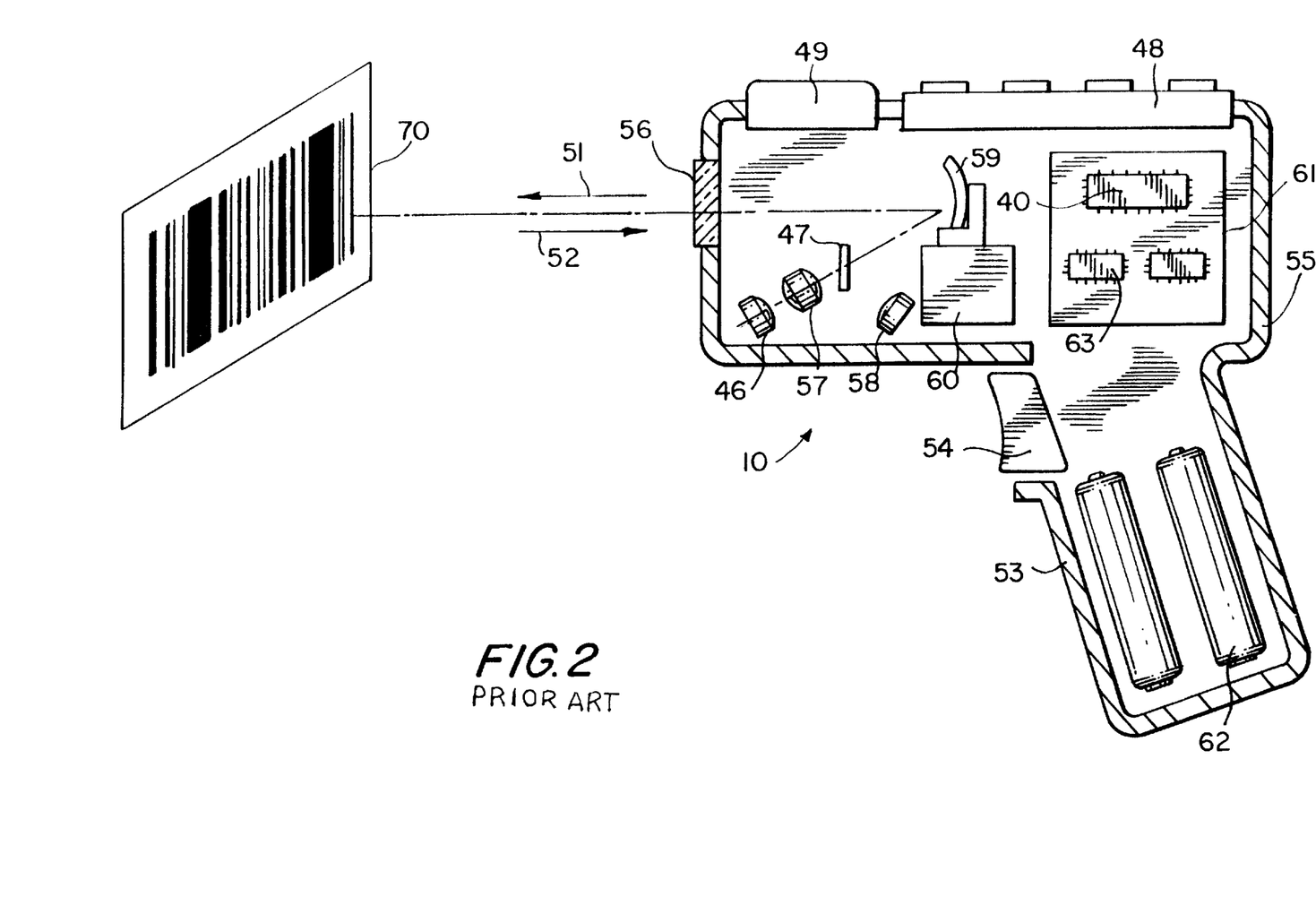
FIG. 2 is a schematic view of a prior art hand-held laser scanner and data collection terminal.

FIG. 2 illustrates an example of a prior art bar code symbol reader 10 implemented as a gun shaped device, having a pistol-grip type of handle 53. A lightweight plastic housing 55 contains a light source 46, a detector 58, optics 57, signal processing circuitry 63, a programmed microprocessor 40, and a power source or battery 62. A light-transmissive window 56 at the front end of the housing 55 allows an outgoing light beam 51 to exit and an incoming reflected light 52 to enter. A user aims the reader 10 at a bar code symbol 70 from a position in which the reader 10 is spaced from the symbol, i.e. not touching the symbol or moving across the symbol.

As further depicted in FIG. 2, the optics may include a suitable lens 57 (or multiple lens system) to focus the scanned beam into a scanning spot at an appropriate reference plane. The light source 46, such as a semiconductor laser diode, introduces a light beam into an optical axis of the lens 57, and the beam passes through a partially-silvered mirror 47 and other lenses or beam shaping structures as needed. The beam is reflected from an oscillating mirror 59 which is coupled to a scanning drive motor 60 energized when a trigger 54 is manually pulled. The oscillation of the mirror 59 causes the outgoing beam 51 to scan back and forth in a desired pattern.

A variety of mirror and motor configurations can be used to move the beam in a desired scanning pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternative circumferential directions about a drive shaft on which the multi-mirror construction is mounted.

The light 52 reflected back by the symbol 70 passes back through the window 56 for transmission to the detector 58. In the exemplary reader 10 shown in FIG. 2, the reflected light reflects off of mirror 59 and partially-silvered mirror 47 and impinges on the light sensitive detector 58. The detector 58 produces an analog signal proportional to the intensity of the reflected light 52.

The signal processing circuitry includes a digitizer 63 mounted on a printed circuit board 61. The digitizer processes the analog signal from detector 58 to produce a pulse signal where the widths and spacings between the pulses correspond to the widths of the bars and the spacings between the bars. The digitizer serves as an edge detector or wave shaper circuit, and a threshold value set by the digitizer determines what points of the analog signal represent bar edges. The pulse signal from the digitizer 63 is applied to a decoder, typically incorporated in the programmed microprocessor 40 which will also have associated program memory and random access data memory. The microprocessor decoder 40 first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard to which the scanned symbol conforms. This recognition of the standard is typically referred to as autodiscrimination.

To scan the symbol 70, the user aims the bar code reader 10 and operates movable trigger switch 54 to activate the light source 46, the scanning motor 60 and the signal processing circuitry. If the scanning light beam 51 is visible, the operator can see a scan pattern on the surface on which the symbol appears and adjust aiming of the reader 10 accordingly. If the light beam 51 produced by the source 46 is marginally visible, an aiming light may be included. The aiming light, if needed, produces a visible-light spot which may be fixed, or scanned just like the laser beam 51. The user employs this visible light to aim the reader at the symbol before pulling the trigger.

The reader 10 may also function as a portable data collection terminal. If so, the reader 10 would include a keyboard 48 and a display 49, such as described in the previously noted U.S. Pat. No. 4,409,470.

Whilst the known electro-optical systems function highly successfully as readers it is desired to extend their capabilities beyond pure reading implementations.

U.S. Pat. No. 5,577,148 relates to an interactive laser scanner apparatus for displaying an image and receiving input. A video image is displayed at a screen comprising the distal ends of a waveguide bundle. Information can also be received by the apparatus by inputting a signal at the screen which is transmitted by the waveguide bundle and decoded internally.

It is an object of the invention to overcome or mitigate problems associated with known LCD price tagging systems.

In particular it is an object of the invention to provide a system allowing simplified and accelerated updating of prices.

It is a yet a further object of the invention to arrive at improvements to and/or new applications of bar coding systems and other electro-optical readers.

SUMMARY OF THE INVENTION

Objects of the Invention

Objects of the invention are set out above. A principal object of the invention is to overcome, avoid or mitigate problems associated with prior art arrangements.

FEATURES OF THE INVENTION

According to the invention there is provided a product information display device for location in association with a selected product, including an electronic display for displaying product information and an optical detector for receiving a data beam signal carrying product information to be displayed. As a result, simple, rapid, and efficient information up-date is achieved.

The electronic display may comprise an electronic price display and/or an LCD display for example a shelf-mountable product information tag, or a hanging display board, and the electronic display is preferably arranged to display alphanumeric information. The optical detector may be arranged to receive a laser data beam signal. The device may further include a manual data input.

According to the invention there is further provided a product information transfer system comprising a product information display device including an electronic display for displaying product information and an optical detector, the system further comprising a data transfer device including a data beam signal generator for generating a data beam signal carrying product information, wherein the optical detector is arranged to receive the data beam signal, and wherein the display device further includes a processor for processing the received signal and displaying the product information on the electronic display.

The electronic display may comprise an LCD display. The data transfer device may comprise an electro-optical reader. The electro-optical reader may comprise a bar code reader including laser beam generating means in conjunction with the laser beam modulator for generating a modulated data beam signal. The electro-optical reader may comprise a flying spot optical reader or a field of view optical reader. The laser beam modulator may comprise a dedicated module insertable into cooperation with the laser beam generating means on the electro-optical reader.

The system may comprise a mount for the display device, the mount including at least one lip for partially encapsulating and retaining the display device. The mount may supply power to the display device.

According to the invention there is further provided a data transfer device comprising an electro-optical reader having a reading beam generator, a reading beam detector, and a modulator for modulating the reading beam to generate a data beam signal for transfer. The electro-optical reader may comprise a bar code reader.

According to the invention there is further provided a flying spot optical scanner including a scanning beam generator, a scanning beam detector, and a modulator for modulating the scanning beam to generate a modulated data carrying scanning beam signal.

According to the invention there is further provided a field of view optical reader including a reading beam generator, a reading beam detector and a modulator for modulating the reading beam to generate a data carrying reading beam signal.

According to the invention there is further provided a method of transferring product information to a product information display device including an electronic display and an optical detector, the method comprising the steps of storing the product information in a data transfer device including reading beam generating means and modulating means, modulating the generated reading beam to generate a modulated product information carrying data beam signal, the data beam signal being received by the optical detector and the product information being derived from the data beam signal and displayed on the electronic display.

The data transfer device may comprise a bar code reader, and product information presented in a bar code symbol may be read and stored in a bar code reader for transfer to the display device. The product information may be entered via manual input means to the data transfer device and stored therein for transfer to the display device. Product information may be downloaded from a data storage device to the data transfer device for storage therein and subsequent transfer to the display device.

According to the invention there is further provided a bar code reader comprising a reading beam generator and a modulator associated with the reading beam generator and arranged to modulate the generated reading beam for modulated data transfer thereby.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings. Further features of the invention are set out in the appended independent claims, and further preferred features are set out in the dependent claims.

DETAILED DESCRIPTION OF THE PREFERRED EMBODIMENTS

As used in this specification and in the appended claims, the term "indicia" broadly encompasses not only symbol patterns composed of alternating bars and spaces of various widths commonly referred to as bar code symbols, but also another one or two dimensional graphic patterns, as well as alphanumeric characters. In general, the term "indicia" may apply to any type of pattern or information which may be recognized or identified by scanning a light beam and detecting reflected or scattered light as a representation of variations in light reflectivity at various points of the pattern or information. A bar code symbol is one example of an "indicia" which the present invention can scan.

Figure 3A:
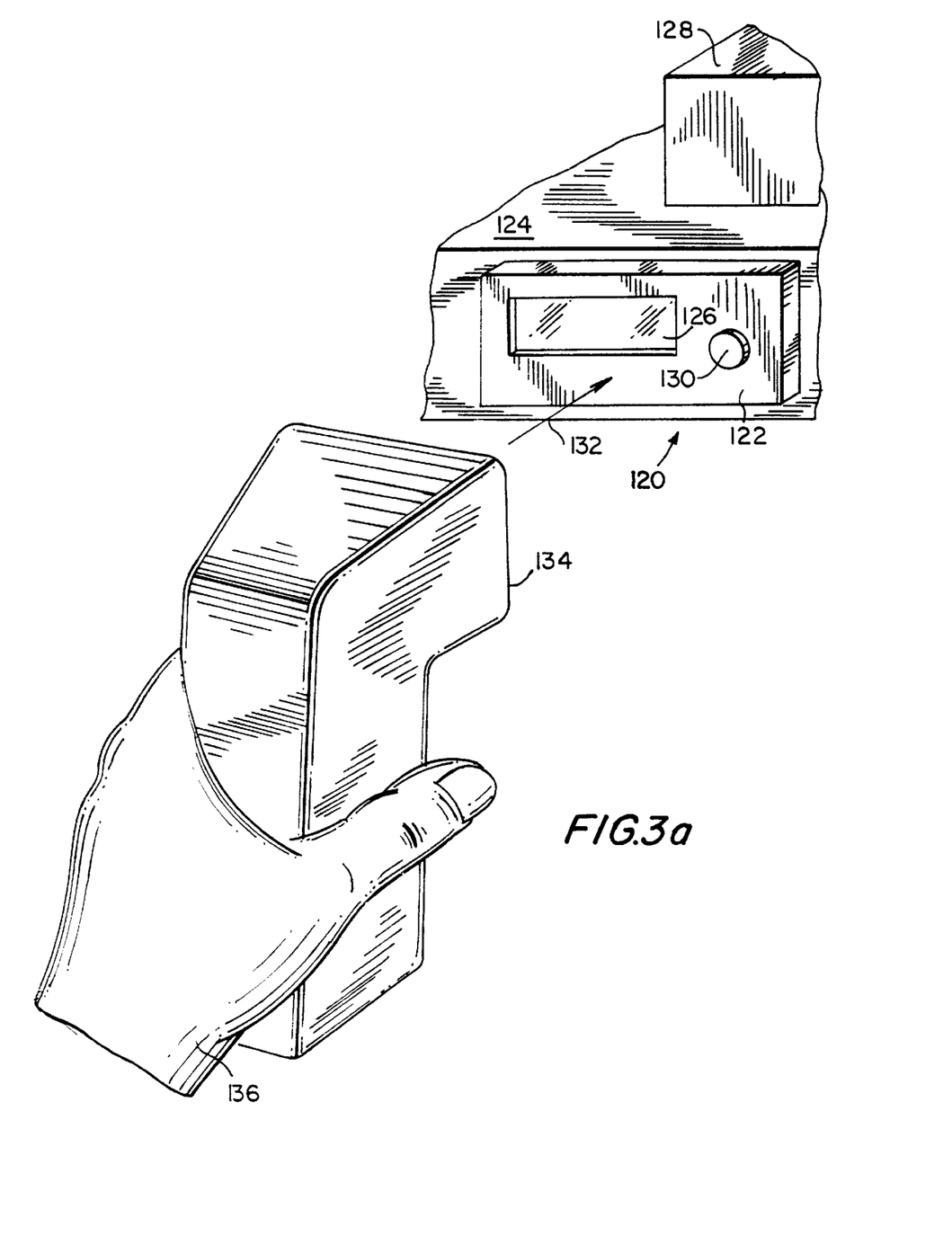
FIG. 3a shows schematically operation of an embodiment of the present invention.

Referring now to FIG. 3a, one aspect of the present invention is illustrated. An LCD price tagging system generally designated 120 includes an LCD price tag 122 generally of the type shown in FIG. 1. The LCD price tag 122 is carried on a shelf 124 and includes a display 126 for displaying information concerning a product 128 carried on the shelf 124. The displayed information at display 126 can include the price of the product 128, or other status information such as whether it is on sale. Unlike prior art systems, the LCD price tag 122 includes a detector 130. The detector 130 is arranged to detect an incoming beam from a remote point carrying data relating to the product status. As a result the information displayed on the display 126 of the LCD price tag 122 can be simply and easily updated by scanning a suitable data carrying beam across the detector 130. The data carrying beam is represented generally by arrow 132 and is generated by a scanner 134. The beam 132 comprises a modulated laser beam discussed in more detail below. The scanner 134, for example, comprises a conventional bar code scanner but modified to output a modulated laser beam 132 containing the product data. As a result of the system an operator 136 can update the LCD price tag 122 quickly and efficiently by scanning the beam 132 using scanner 134 across the detector 130. Price tags across the whole retail outlet can thus be updated in a fraction of the time found in prior art systems leading to attendant improvements in efficiency and cost-time benefits.

It will be appreciated that the price tag can be used in any type of retail outlet including retail merchandise stores selling general products as well as supermarkets and the like. The price tag can carry any desired amount of information, limited only by the extent of the display and memory capabilities. For example the price tag can carry alphanumeric information such as Sale 99 cents" or "50% off" or "freshly baked" or any other appropriate message to display information concerning the related product and/or attract the customer's attention. In addition the tag need not be the small, compact display at shelf level as shown in FIG. 3a, but can be provided "over the counter", or as a hanging display board and so forth.

Figure 3B:
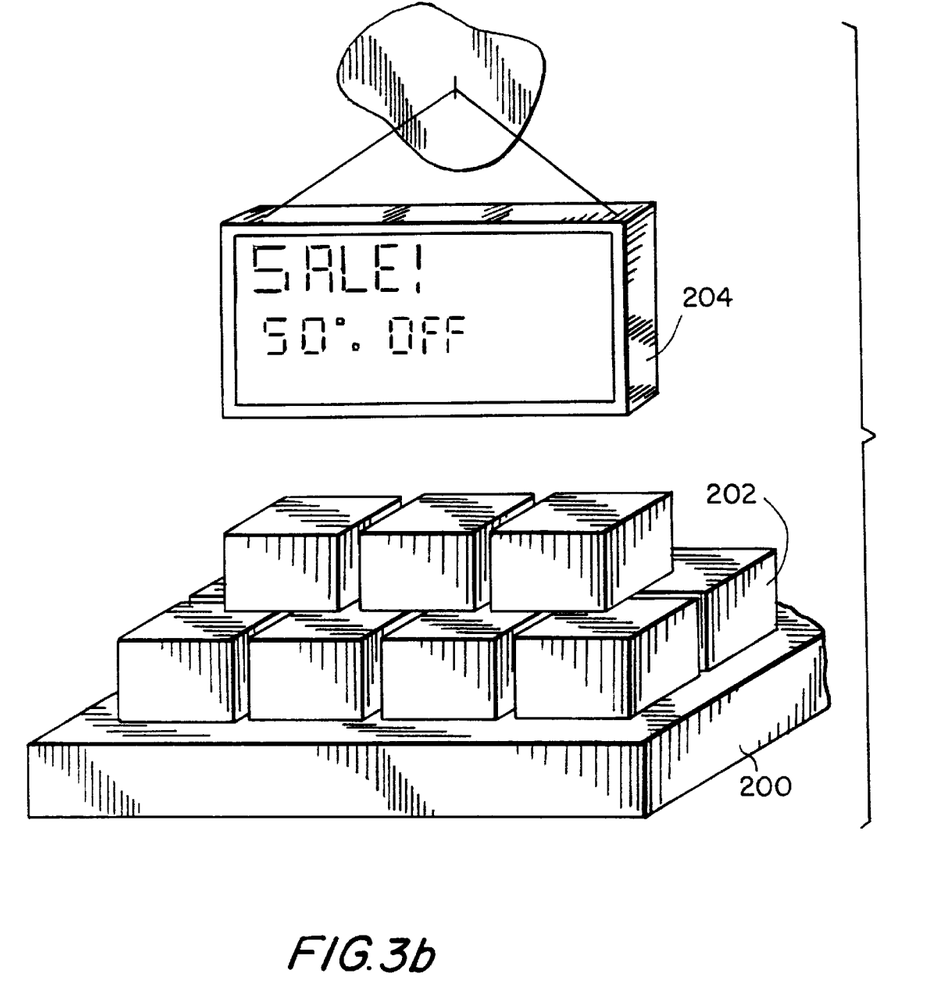
FIG. 3b shows schematically an alternative mode of operation.

Such an alternative configuration is shown in FIG. 3b. A retail product display comprises a plinth 200 and a plurality of boxed products 202. A price tag of the hanging display type 204 is suspended above the product display and carries alphanumeric information relating to the product type for example "Sale! 50% off". Any desired information can of course be provided on the hanging display 204, such as simple price information or advertising information for attracting the customer's attention. It will be appreciated that the following discussion concerning the specific implementation of the invention applies equally to this hanging display type and provides the same benefits and improvements as for the shelf mounted type. Any other suitable display can be modified accordingly.

Figures 4, 5:
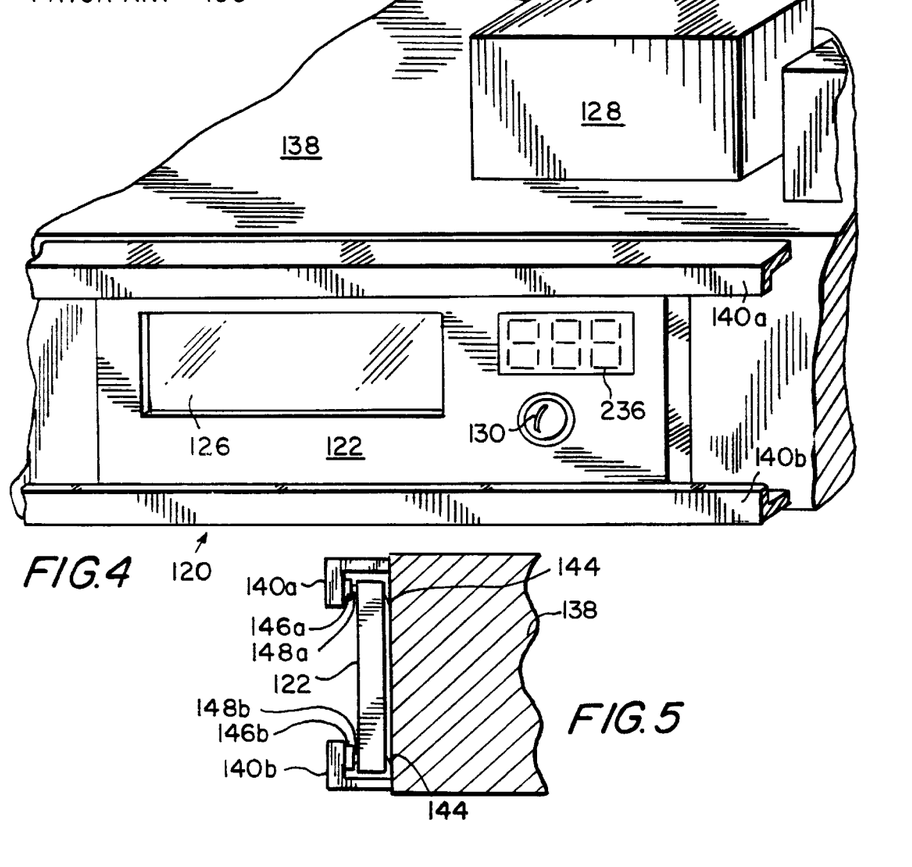
FIG. 4 shows an LCD price tag according to the present invention in more detail.
FIG. 5 is a sectional side view of the embodiment shown in FIG. 4.
Figure 6:
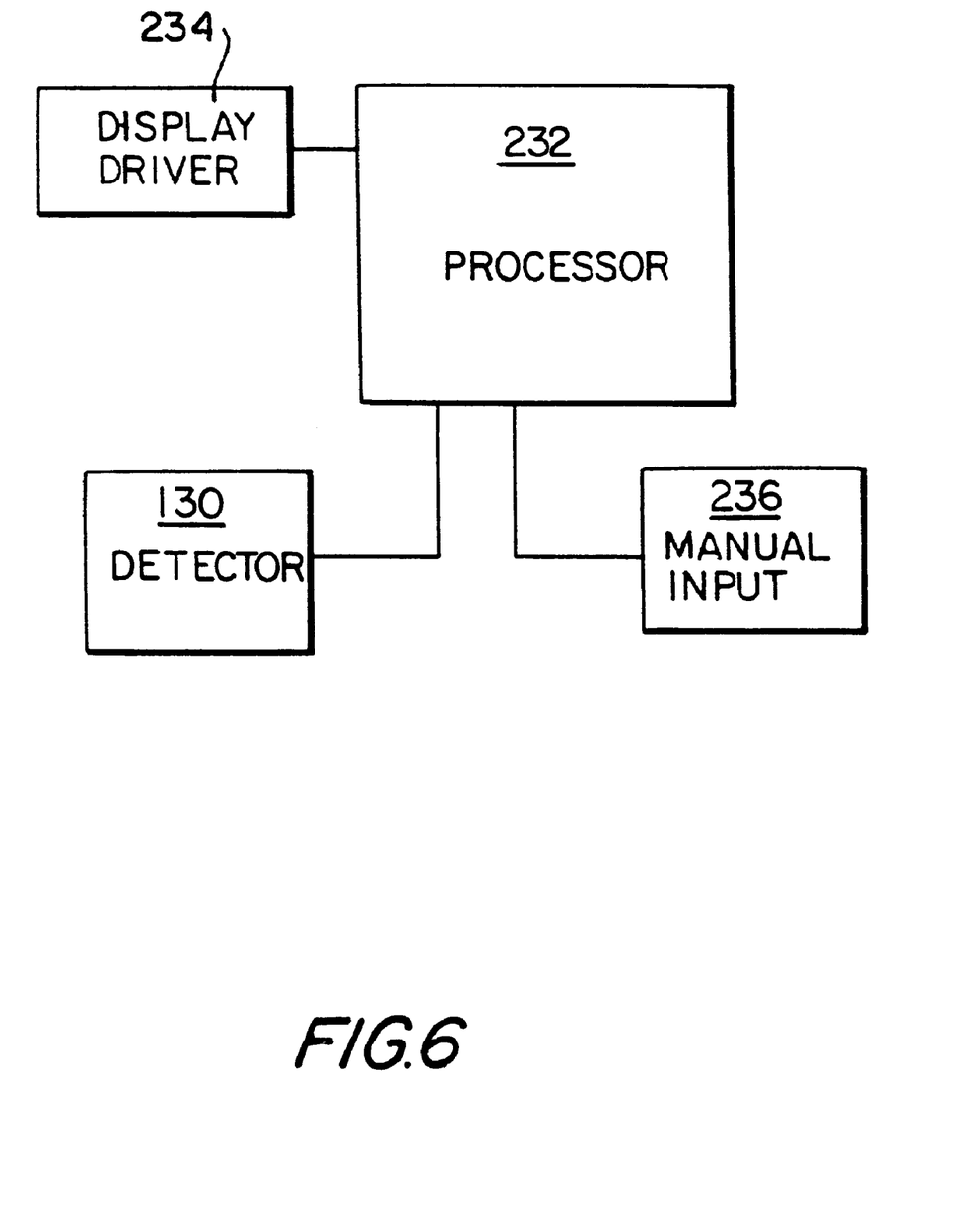
FIG. 6 is a block diagram indicating the components of an LCD price tag according to the present invention.

The LCD price tag according to the present invention is illustrated in more detail in FIGS. 4 to 6. The detector 130 comprises, for example, an electro-optical detector of known type suitable to receive and transduce an input beam comprising, for example, a series of on-off pulses in the time domain. As can be seen from the block diagram of FIG. 6, the detector 130 is connected to a processor 232 which decodes the data carried in the input beam to derive the product information contained therein. The product information is then transferred to a display driver 234 which converts the information to a suitable form to be displayed on LCD display 126. It will be appreciated, of course, that any other suitable form of display for example CRT or LED can be used in place of the LCD display 126.

The LCD price tag 122 optionally further includes a manual input device 236 which is either concealed on the front face of the price tag 122 to avoid unauthorized tampering or, in cases where the price tag 122 is removable as discussed in more detail below, provided on the back of the price tag 122. The manual input device 236 allows, for example, initialization of the price tag 122 or manual data input or override information where the scanner is not available or not functioning correctly. Referring once again to FIG. 6, the manual input 236 is connected to the processor 232 allowing manually input information to be decoded and/or transferred to display driver 234. The processor 232 can include suitable prioritizing means for cases where conflicting or non-complementary information is received from both detector 130 and manual input 236.

It will be seen that the LCD price tag 122 can be permanently attached at a desired position along the shelf. In cases where rearrangement of the products is envisaged, however, dedicated positioning of the LCD price tag may be undesirable. In the embodiment shown in FIGS. 4 and 5, accordingly, an arrangement is shown allowing adjustment of the position of the LCD price tag along the shelf 138. In particular a pair of retaining rails comprising an upper rail 140a and a lower rail 140b are provided. The rails are substantially L-shaped, having first legs projecting from the shelf 138 and respective second legs facing one another. Accordingly the rails 140a,140b effectively define a slot into which the LCD price tag 122 can be inserted. The price tag 122 can thus be slid to any desired position along the shelf, allowing products 142 to be positioned at any desired location. The LCD price tag 122 can be retained in a given position by friction alone or by detent means. For example a plurality of detents comprising projections from each rail 140a,140b can be provided along the lengths of the rails with cooperating recesses in the LCD price tag 122, allowing positioning of the LCD price tag at any of the predetermined positions. Alternatively, or in addition, resilient biasing means 144 such as springs can be provided biasing the LCD price tag into frictional engagement with either of the shelf 138 or the rails 140a,140b to allow retention of the LCD price tag 122 in a desired position. It will be seen that the resilient biasing means 144 can be provided in any suitable position, for example extending from the back of the LCD price tag towards the shelf 138 or vice versa, extending from the upper and lower surfaces of the LCD price tag 122 into contact with the rails 140a,140b or vice versa and so forth.

In the embodiment shown it is preferred that the resilient biasing means 144 extend from the front of the LCD price tag (rather than providing such means along the entire length of the shelf 138). As a result the LCD price tag 122 is biased into contact with the inwardly facing portion of each rail 140a,140b. Each rail 140a,140b carries a power line 146a, 146b on the inwardly facing portion. The power lines 146a,146b communicate with the contacts 148a,148b on the LCD price tag 122. As a result the LCD price tag 122 does not have to carry a self-contained power supply allowing corresponding space savings. Of course the power lines 146a,146b and the corresponding contacts 148a,148b can be provided in other facing points between the LCD price tag 122 and the rails 140a,140b and/or the shelf 138. It is desirable, however, that the power lines 146a,146b are not easily accessible by passers-by in regions where there is no LCD price tag 122. Of course the rails 140a,140b are suitably insulated from the power lines 146a,146b.

Figure 7:
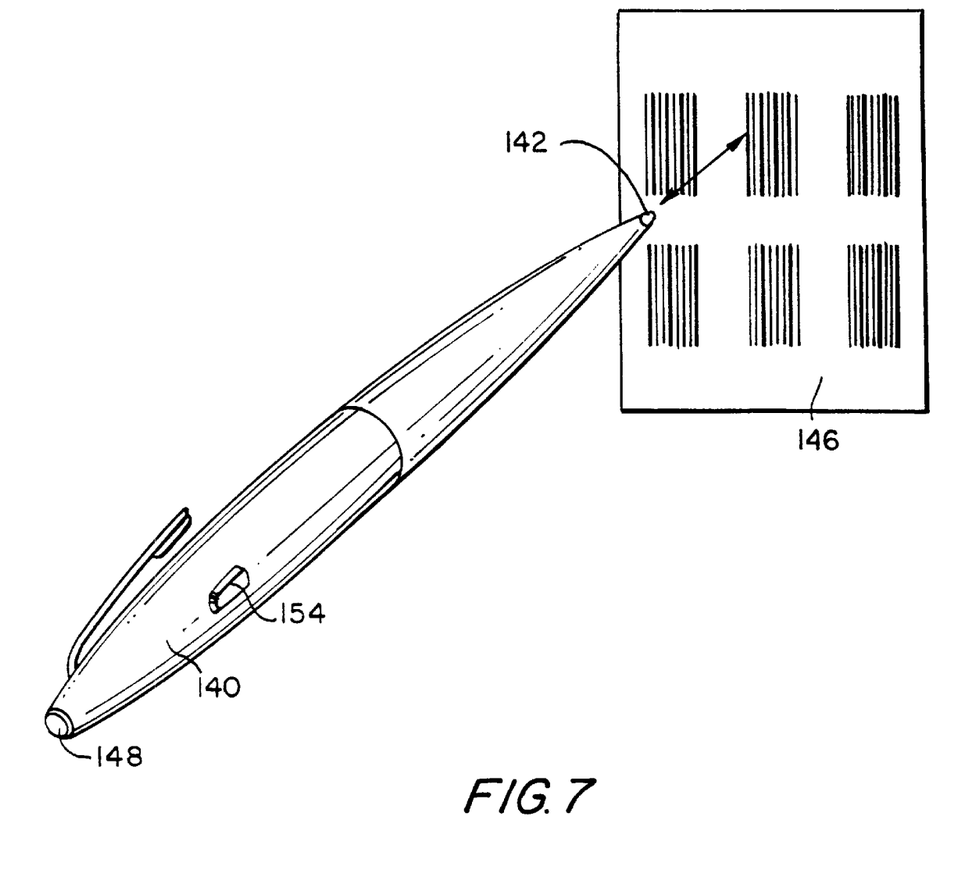
FIG. 7 shows a wand-type reader according to the present invention.

It will be understood that the scanner 134 can, for example, be a suitably modified scanner of the type shown in FIG. 2. The conventional scanner will simply scan a laser beam of substantially constant intensity across a bar code symbol in order for the reflected beam to be detected and the information stored in a bar code symbol determined from the variations in reflectivity. In order to modify the conventional scanner, therefore, it is simply necessary to modulate the constant laser beam in any suitable manner. For example the product information to be input to the LCD price tag can be represented in binary code, the laser beam being modulated between an on state, representing a 1, and an off state representing a 0. As a result a stream of pulses carrying information is received and decoded by the LCD price tag 122. Modulation may be carried out by a dedicated controller provided in the reader. Alternatively, a modular system may be incorporated whereby a modulating module may be connected with the existing system to allow data transfer from the scanner. Although a "flying spot" optical scanner is shown it will be appreciated that a field of view optical scanner can equally be used, for example in the form of a wand-type hand-held reader 140 as shown in FIG. 7, having a reading window 142.

Various methods can be used to input the product information to the reader 140. For example where size permits the information can be input manually to a keyboard on the reader and then transmitted to the LCD price tag 122. Alternatively product information for a given product can be carried on a printed sheet 146 of bar code symbols. The appropriate bar code symbol is read by the reader 140 in a reading mode and the product information is stored in the reader. The reader is then switched to an output mode either by a manual switch 154 or by some form of recognition of the LCD price tag. The beam from the reader 140 is modulated as discussed above to carry the product information and that information is transmitted to the detector 130 of the LCD price tag 122.

As a further possibility, the product information can be downloaded directly from a central computer. This can be via a physical interface (not shown) in which case the reader 140 is simply connected to the processor for transferring the product information, or via an optical, acoustic, radio or other interface 148 such as a "touch memory" button of the type sold by Dallas Semi-conductors. Once again the downloaded information is stored in the reader 140 and transmitted via a modulated laser beam to the LCD price tag 122 in due course.

Where a series of price changes of different products are envisaged, all of the information can be entered into the scanner reader at the outset using any of the methods discussed above or any other appropriate method. This leads to a more efficient system as the LCD price tag relating to each of the products can be serially updated very quickly once the information has been stored in the scanner 134. It will be seen that such a system would allow prompt centralized price updating across a chain of retail outlets, the centrally determined price updates being carried to a data port at each retail outlet via a suitable computer network and stored in the scanner 134.

Where a series of updates were carried out it would of course be vital to ensure that each price update was transferred to the correct LCD price tag accompanying the related product. This can be done in various manners. For example where the LCD price tag 122 is dedicated to a given product, it could include suitable recognition means such as RFID tag. Alternatively bar code information stored on the products themselves could be read by the scanner 134 and the associated price update information retrieved and transferred to the corresponding LCD price tag 122.

It will be seen that the data transfer system described hereabove with specific reference to LCD price tags could be used in many other implementations. Indeed the general principal of modulating the reading beam of an electro-optical reader in order to transmit data will have many applications and will allow a yet wider range of use to existing scanners than is already available.

While the invention has been illustrated and described as embodied in an LCD price tagging system, it is not intended to be limited to the detail shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint or prior art, fairly constitute essential characteristics of the generic or specific aspects of this invention and, therefore, such adaptations should and are intended to be comprehended within the meaning and range of equivalence of the following claims. What is claimed as new and desired to be protected by Letters Patent is set forth in the appended claims.

We claim:

1. A system for displaying information about products identifiable by indicia having parts of different light reflectivity, the system comprising:

a) an information module mounted in association with a selected product;

b) an optical detector supported by the module, for detecting an information-carrying optical signal;

c) a portable, hand-held unit operative, in a scanning mode, for electro-optically reading by wireless transmission an indicium associated with the selected product to identify the product and operative, in a data transfer mode, for transmitting by wireless transmission the information-carrying optical signal to the optical detector;

d) a storage device supported by the unit, for storing and delivering product information about the identified product after product identification;

e) a modulator operatively connected to the storage device, for placing the product information delivered by the storage device in the information-carrying optical signal; and f) a display supported by the module, for displaying the product information contained in the information-carrying optical signal transmitted by the unit to the optical detector.

2. The system of claim 1, wherein the module has a generally planar housing, and wherein the optical detector and the display are mounted on an exterior surface of the housing.

3. The system of claim 2; and further comprising concealed keys on the housing.

4. The system of claim 2; and further comprising a pair of elongated rails extending along an outer edge of a shelf, and wherein the housing is mounted for sliding movement on and along the rails.

5. The system of claim 4; and further comprising a pair of electrical power conductors mounted on and along the rails for supplying electrical power to the module.

6. The system of claim 4; and further comprising means for resiliently biasing the housing against the rails.

7. The system of claim 2; and further comprising a mount for suspending the housing at an elevation above the products.

8. The system of claim 1; and further comprising a plurality of keys supported by the reader, for manually entering the product information to the storage device.

9. The system of claim 1; and further comprising a printed sheet containing a plurality of symbols each coded with the product information, for automatically entering the product information to the storage device during a reading mode of the unit.

10. The system of claim 1, wherein the reader includes a light source for directing a light beam at the indicium for reflection therefrom, a light sensor having a field of view for sensing light reflected off the indicium, and a scanner for scanning at least one of the light beam and the field of view.

11. The system of claim 10, wherein the scanner sweeps the light beam across the indicium during the scanning mode, and wherein the modulator is operative for modulating the light beam to generate a modulated light beam which constitutes said information-carrying optical signal during the data transfer mode.

12. The system of claim 1, wherein the display is a liquid crystal display.

13. The system of claim 1, wherein the product information is a price for the identified product.

14. A method of displaying information about products identifiable by indicia having parts of different light reflectivity, the method comprising the steps of:

a) mounting an information module in association with a selected product;

b) manually holding a portable unit and actuating the reader, in a scanning mode, to electro-optically read an indicium associated with the selected product to identify the product and, in a data transfer mode, to retrieve product information about the identified product, to place the product information in an optical signal, and to transmit the information-carrying optical signal to the module;

c) detecting the information-carrying optical signal transmitted to the module; and d) displaying the product information contained in the information-carrying optical signal.

15. The method of claim 14, wherein the mounting step is performed by mounting the module for sliding movement along an outer edge of a shelf.

16. The method of claim 14, wherein the mounting step is performed by suspending the module above the products.

17. The method of claim 14; and further comprising the step of manually entering the product information to the unit.

18. The method of claim 14; and further comprising the step of automatically entering the product information to the unit.

19. The method of claim 14, wherein the actuating step is performed, during the scanning mode, by sweeping a light beam across the indicium and, during the data transfer mode, by modulating the light beam to generate a modulated light beam which constitutes the information-carrying optical signal.

20. The method of claim 14, wherein the displaying step is performed by displaying a price of the identified product.

\* \* \* \* \*